(12) United States Patent
Maurer

(10) Patent No.: US 6,982,072 B2
(45) Date of Patent: Jan. 3, 2006

(54) PROCESS FOR THE PRODUCTION OF HYDROGEN PEROXIDE

(75) Inventor: Bernhard Maurer, Freistritz/Drau (AT)

(73) Assignee: Degussa AG, Düsseldorf (DE)

( * ) Notice: Subject to any disclaimer, the term of this patent is extended or adjusted under 35 U.S.C. 154(b) by 296 days.

(21) Appl. No.: 10/367,174

(22) Filed: Feb. 14, 2003

(65) Prior Publication Data

US 2003/0165422 A1 Sep. 4, 2003

(30) Foreign Application Priority Data

Feb. 21, 2002 (DE) ................................ 102 07 407

(51) Int. Cl.
*C01B 15/023* (2006.01)
(52) U.S. Cl. .................................... 423/588
(58) Field of Classification Search ................ 423/588, 423/589, 590
See application file for complete search history.

(56) References Cited

U.S. PATENT DOCUMENTS

| | | | |
|---|---|---|---|
| 2,369,912 A | | 2/1945 | Pfleiderer et al. |
| 2,902,347 A | * | 9/1959 | Cosby et al. ............... 423/590 |
| 2,995,424 A | * | 8/1961 | Farrell ........................ 423/590 |
| 3,073,680 A | | 1/1963 | Jenney et al. |
| 3,752,635 A | | 8/1973 | Liebert et al. |
| 3,752,885 A | * | 8/1973 | Liebert et al. ............... 423/588 |
| 3,761,580 A | * | 9/1973 | Schreyer et al. ............ 423/588 |
| 4,485,084 A | | 11/1984 | McIntyre |
| 4,503,028 A | * | 3/1985 | Franzén et al. ............. 423/588 |
| 5,302,367 A | * | 4/1994 | Signorini et al. ........... 423/588 |

FOREIGN PATENT DOCUMENTS

| | | |
|---|---|---|
| DE | 2 003 268 | 7/1971 |
| DE | 40 29 784 | 4/1991 |
| GB | 769 515 | 3/1957 |
| WO | WO 86-06710 | 11/1986 |

OTHER PUBLICATIONS

Robert H. Perry et al, Chemical Engineers' Handbook, Fourth Edition, (1973), pp. 6-13, 6-14, McGraw-Hill Book Company. (no month).*
International Search Report, dated May 9, 2003, issued by the European Patent Office, for International Patent No. PCT/EP03/00443 (3 pages).
Elvers, Barbara, ed., "Hydrogen Peroxide," Ullmann's Encyclopedia of Industrial Chemistry, 1989, pp. 447-448 and 449-457, vol. A 13, VCH Verlagsgesellschaft, Weinheim, Germany (11 pages), (no month).

* cited by examiner

*Primary Examiner*—Wayne A. Langel
(74) *Attorney, Agent, or Firm*—Smith, Gambrell & Russell, LLP

(57) ABSTRACT

The anthraquinone process for producing hydrogen peroxide, including a hydrogenation step, an oxidation step and an extraction step. The oxidation waste gas leaving the oxidation reactor at an excess pressure is passed as a propellant jet to one or more gas jets and whereby a vacuum is produced for auxiliary processes, such as drying of the working solution, distillation of the aqueous hydrogen peroxide solution and drawing off of ventilator gases from solvent storage tanks.

18 Claims, 4 Drawing Sheets

US 6,982,072 B2

PROCESS FOR THE PRODUCTION OF HYDROGEN PEROXIDE

INTRODUCTION AND BACKGROUND

This invention relates to a process for the production of hydrogen peroxide by the anthraquinone process and is directed in particular to the use of the oxidation waste gas as an energy carrier in various processing steps of the overall process.

As is generally known, in the so-called anthraquinone process for producing hydrogen peroxide, a working solution, which contains one or more anthraquinone derivatives as reaction carriers dissolved in an organic solvent or mixed solvent, is hydrogenated in the presence of a suspension catalyst or of a fixed-bed catalyst. In this hydrogenation step, at least part of the reaction carrier is converted into the corresponding anthrahydroquinone derivative. In the subsequent oxidation step the hydrogenated working solution, freed from the catalyst, is gassed with oxygen or with an oxygen-containing gas, in most cases air, and the reaction carrier is converted back into the anthraquinone form, with the production of hydrogen peroxide. In the subsequent extraction step, the hydrogen peroxide contained in the oxidized working solution is extracted with water or with a diluted aqueous hydrogen peroxide solution. The hydrogen peroxide can also be recovered from the oxidized working solution by means of a desorption process, instead of an extraction. The recovered working solution is again recirculated to the hydrogenation step.

In addition to the processing steps mentioned above, the anthraquinone process includes a number of other processing steps, which are essential for an economically efficient operation. These include: concentration and purification of the aqueous hydrogen peroxide solution obtained; drying of the working solution recovered from the extraction step prior to its being recirculated to the hydrogenation step; regeneration of the working solution for the purpose of converting into active components those components of the reaction carrier which have become inactive and regeneration of the hydrogenation catalyst for the purpose of reactivating it. A summary of the anthraquinone process, which is relied on and incorporated herein by reference, is found in Ullmann's Encyclopedia of Industrial Chemistry, $5^{th}$ Ed., 1989, Vol. A13, pages 447–457.

The oxidation step is carried out in one or more serially connected oxidation reactors, which are operated in a cocurrent or countercurrent manner; a combination of the two modes of operation is also known. Where the oxidation step is carried out industrially, in particular such measures are taken as will enable the residence time of the working solution in the oxidation step to be kept as short as possible, in order to minimize the extent of secondary product formation. Besides the citation given above, examples of methods of carrying out the oxidation step may also be found in DE-Auslegeschrift 20 03 268 and in the U.S. Pat. Nos. 3,073,680 and 3,752,885.

According to WO 86/06710, the oxidation can be carried out within a short period and with little technical expense by intensively gassing the hydrogenated working solution with an oxidizing gas in a cocurrent reactor at temperatures of below 100° C. and at excess pressures of below 15 bar, with the formation of a coalescence-inhibited system, and by separating the coalescence-inhibited system, after it has passed through the oxidation reactor or reactors, into a liquid phase and an oxidation waste gas.

In the process just considered and in other oxidation processes using air, the oxidation waste gas, before this can be released into the atmosphere, is expanded and then freed from organic constituents of the solvent in a waste-gas purifier. The waste-gas purifiers are in particular adsorption devices, such as adsorption towers, which are filled with a suitable adsorbent material, such as activated carbon or a natural or synthetic oxide or siliceous adsorbent, including zeolites. Activated carbon is the preferred adsorbent material. Alternatively to this, the oxidation waste gas can be purified by means of a liquid absorber (gas washer) or by freezing out the organic constituents.

As the oxidation reactors are operated using air under excess pressure, the oxidation waste gas also leaves the oxidation reactors still at an increased pressure, even in the case of a high conversion of the oxygen in the air. Before the oxidation waste gas is passed to the waste-gas purification step for the purpose of depleting it of contained organic constituents, the waste gas, which has generally been freed beforehand from dissolved constituents in a condensation step, has to be largely or completely expanded. Where activated carbon towers are used for the purpose of waste-gas purification, these are cyclically regenerated by desorbing the adsorbed solvent by means of medium-pressure steam.

As is known from DE 40 29 784 or from the previously cited Ullmann reference (pages 453–454), the oxidation step can be carried out free from waste gas by using pure oxygen instead of air, but this mode of operation is less economically efficient than the use of air. Accordingly, the invention is not directed towards processes involving a waste-gas free oxidation step.

A disadvantage of the known process for carrying out the oxidation step using air with subsequent expansion and purification of the oxidation waste gas is that a considerable quantity of energy is destroyed during the expansion.

Accordingly, an object of the present invention is to demonstrate a way whereby the energy contained in the oxidation waste gas can be used in the overall process for producing hydrogen peroxide and hence to increase the economic efficiency of the process.

A further object is to lower the input of external energy for producing the vacuum required at various points in the anthraquinone process.

SUMMARY OF THE INVENTION

The above and other objects of the present invention can be achieved by using the oxidation waste gas under pressure as a propellant gas for one or more gas jets and thereby drawing off the ventilator gas accumulating at various points in the overall process and/or producing a vacuum for various auxiliary processes.

In one embodiment for carrying out the invention, a vacuum is produced in a distillation unit for concentrating aqueous hydrogen peroxide. Hitherto, water-ring pumps or pumps operated by other propellant media, such as steam and cooling water, have been used for vacuum production.

Another embodiment for carrying out the invention is the production of the vacuum to be used for the vacuum dryers by means of which the working solution is dried prior to being recirculated to the hydrogenation step. Here again, known vacuum units, such as water-ring pumps and pumps operated by other media, such as steam, have hitherto been used for vacuum production.

A still further embodiment for the gas jet to be operated according to the invention is the prevention of emissions of solvent into the environment, by drawing off vapours at various potential emission points within the production plant, including ventilator nozzles of storage tanks containing solvents and storage tanks containing working solutions, and passing them to a waste-gas purification plant.

Accordingly, the invention provides a process for the production of hydrogen peroxide by the anthraquinone process in a continuously operated production plant, comprising (i) a hydrogenation step, wherein an organic working solution containing one or more anthraquinone derivatives is hydrogenated in the presence of a heterogeneous catalyst, (ii) an oxidation step, wherein the hydrogenated working solution is oxidized, with the formation of hydrogen peroxide, by introducing an oxygen-containing oxidizing gas, in particular air, at an excess pressure $P_i$ of at least 1 bar into an oxidation reactor and contacting it with the working solution from step (i), withdrawing oxidation waste gas from the oxidation reactor and purifying it, as required, in a waste-gas purification plant, and (iii) a step for recovering the hydrogen peroxide from the oxidized working solution, in particular an extraction step, which is characterized in that the oxidation waste gas, the excess pressure $P_a$ of which is less than $P_i$ but greater than atmospheric pressure $P_0$, is passed as a flow of propellant gas to one or more gas jets and thereby a vacuum is produced for auxiliary processes required in the anthraquinone process, in particular a vacuum for drying the extracted working solution prior to the return of the latter to the hydrogenation step and/or for distilling the aqueous hydrogen peroxide solution and/or for drawing in ventilator gases at emission points of solvent vapours within the production plant, including solvent storage tanks.

BRIEF DESCRIPTION OF DRAWINGS

The present invention is illustrated by the accompanying drawings, wherein.

DETAILED DESCRIPTION OF THE INVENTION

Figure 1:
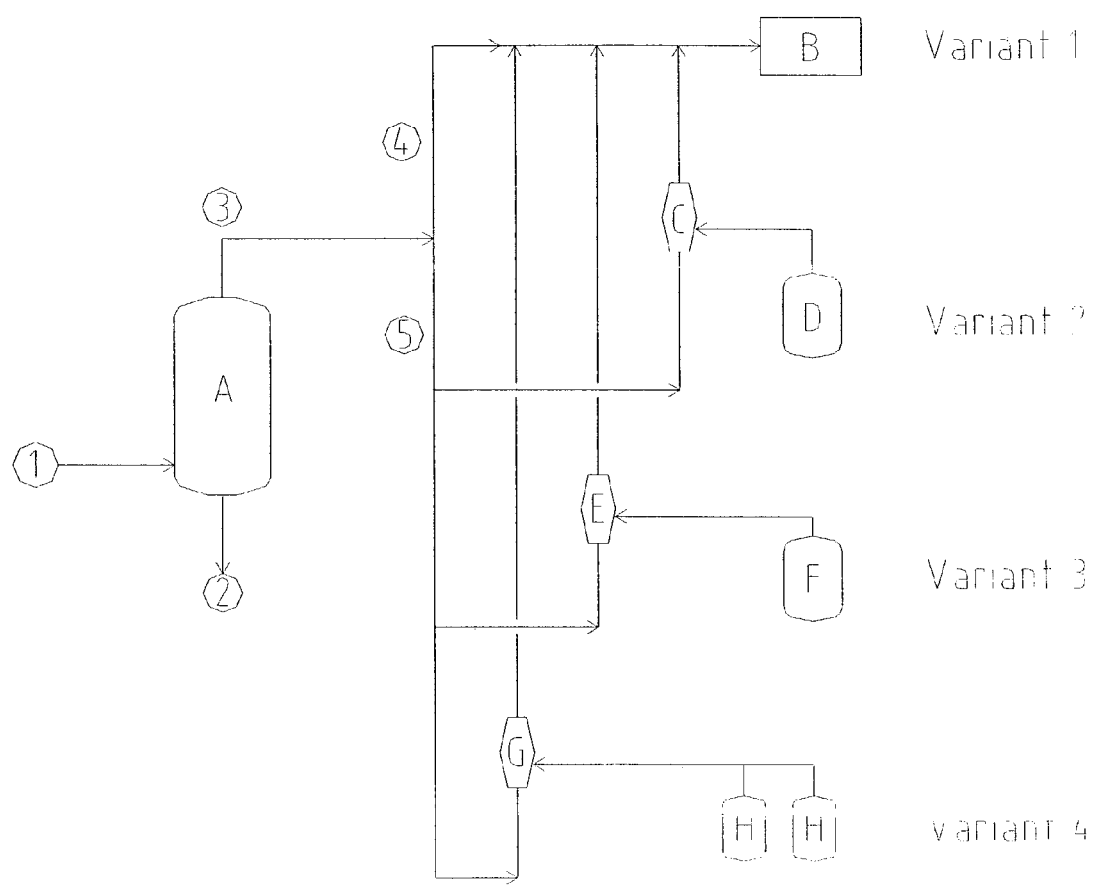
FIG. 1 is a schematic flow diagram illustrating the process of the invention.

In carrying out the present invention, there are a number of preferred embodiments, including the use of the gas jets operated by oxidation waste gas for the production of the vacuum for distillation columns for the purpose of concentrating the aqueous hydrogen peroxide solution, for drying the working solution coming from the extraction step as well as for drawing off solvent-containing gases from various emission points of the production plant. Depending on the actual embodiment of the oxidation step and hence on the accumulated amount of oxidation waste gas, the latter is used for the production of a vacuum for one, two or three of the above-mentioned possible uses.

In the prior art, electrically operated vacuum pumps or steam jets operated by means of medium- or high-pressure steam were used to produce a vacuum in a production plant for the manufacture of hydrogen peroxide. Whereas electrically operated vacuum pumps require considerable maintenance and in addition need electrical energy, steam jets require little maintenance but consume steam and cooling water and necessitate additional expensive peripheral units for treatment of the condensate. In contrast to this, in the process according to the invention, oxidation waste gas, i.e. the residual reaction gas present in large quantities from the oxidation step, is used as propellant gas for one or more gas jets for the purpose of vacuum production and the drawing off, as necessary, of any solvent-containing gases. No external energy, or only a correspondingly decreased quantity, of external energy is needed in order to produce the required vacuum for a dryer, for drawing off organic vapours and/or for one or more distillation columns. Moreover, the mixture of the suction gas and the propellant gas can be freed from organic constituents by environmentally safe means in the waste-gas purification plant which is present in any case.

The oxidizing gas used in the oxidation step is introduced into the oxidation reactor at an excess pressure $P_i$ of at least 1 bar, preferably 2 to 15 bar and particularly preferably 2.5 to 5 bar. The oxidation waste gas leaving the oxidation reactor is at a reduced excess pressure $P_a$ corresponding to the degree of utilization of the oxygen contained in the oxidizing gas and to the total loss of pressure within the oxidation reactor. The excess pressure $P_a$ of the oxidation waste gas is consequently less than the excess pressure $P_i$ and is generally within the range of 1 to 10 bar, preferably 1 to 5 bar and particularly preferably 1.5 to 4 bar. Depending on the amount of oxidation waste gas and on its excess pressure $P_a$, one or more gas jets can be operated and a vacuum produced for one or more of the above-mentioned possible uses.

Commercially available gas jets, which are also referred to as jet pumps, injectors or gas compressors, may be used in the process according to the invention. The design of such gas jets is well-known among experts:—The propellant jet is expanded through a nozzle into a larger mixing section, simultaneously suction gas is drawn in from a suction port and the mixture of suction gas and propellant gas is passed to a pressure joint—see Ullmanns Enzyklopädie der technischen Chemie, 4. Auflage (1973), Vol. 3, page 172, as well as company publications by manufacturers of gas jet pumps, for example, Körting Hannover AG in Germany.

The drying of the moist working solution leaving the extraction, which is at a temperature generally within the range of 30 to 75° C., in particular 40 to 60° C., can be carried out in simple drying apparatus. For example, vacuum tanks with or without baffles are suitable, but a tank provided with a spray trap is preferred, or a short column. A vacuum within the range of 10 to 300 mbar (absolute), in particular 20 to 100 mbar (absolute) is produced in the dryer, using a gas jet operated by oxidation waste gas. The mixture of the propellant gas and vapours drawn in is passed to a waste-gas purifier, in particular to an adsorption device comprising several activated carbon towers.

The distillation vacuum for one or more distillation columns for concentrating aqueous hydrogen peroxide solution is produced in a similar manner. The distillation vacuum is generally within a range of 20 to 200 mbar, in particular 50 to 150 mbar (in each case absolute). The mixture of propellant gas and of previously preferably at least partially condensed vapours is passed to the waste-gas purifier, in order to retain there the organic constituents coming from the propellant jet and to return to the process after desorption.

In order to prevent emissions of solvent from storage tanks filled with organic solvents or working solution, the ventilator gases are safely drawn off by means of a gas jet to be operated according to the invention and the gas mixture is freed from organic constituents in a waste-gas purifier. The suction pressure for drawing off ventilator gases at vent connections is below atmospheric pressure, in particular within the range of 400 to 900 mbar (absolute).

Turning now to the accompanying drawings, FIG. 1 shows in schematic fashion the overall process of the invention.

In operation, air or oxygen containing gas 1 is fed to an oxidation column A with oxidized working solution exiting at 2 and oxidation waste gas 3 proceeding to waste gas purification plant B.

Oxidation waste gas as a flow of propellant gas 5 passes to waste gas purification plant B by way of gas jet(s) C which operates dryer D.

Oxidation waste gas 5 can also proceed to waste gas purification plant B by way of gas jet(s) E or G.

The dryer of extracted working solution D is connected to gas jet C. The distillation system of aqueous hydrogen peroxide F is connected to and operates by way of gas jet E.

Different emissions provide H, H connect with gas jet G for the purpose of drawing off unwanted vapours.

Figure 2:
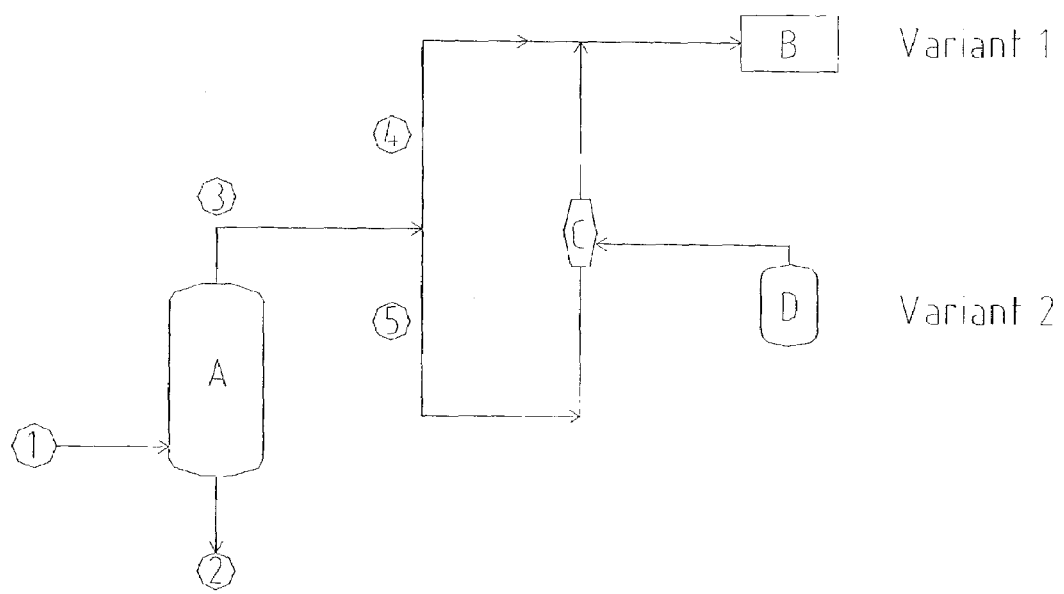
FIG. 2 is a schematic flow diagram of a variation of the process of the invention relating to drying.
Figure 3:
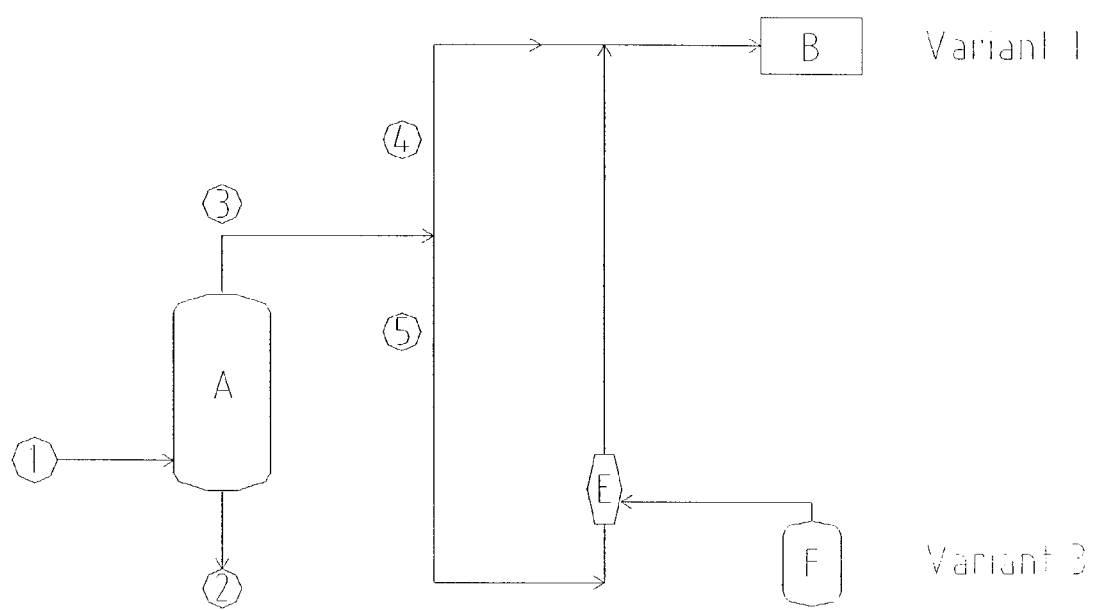
FIG. 3 is a schematic flow diagram of another variation of the process of the invention relating to distillation.
Figure 4:
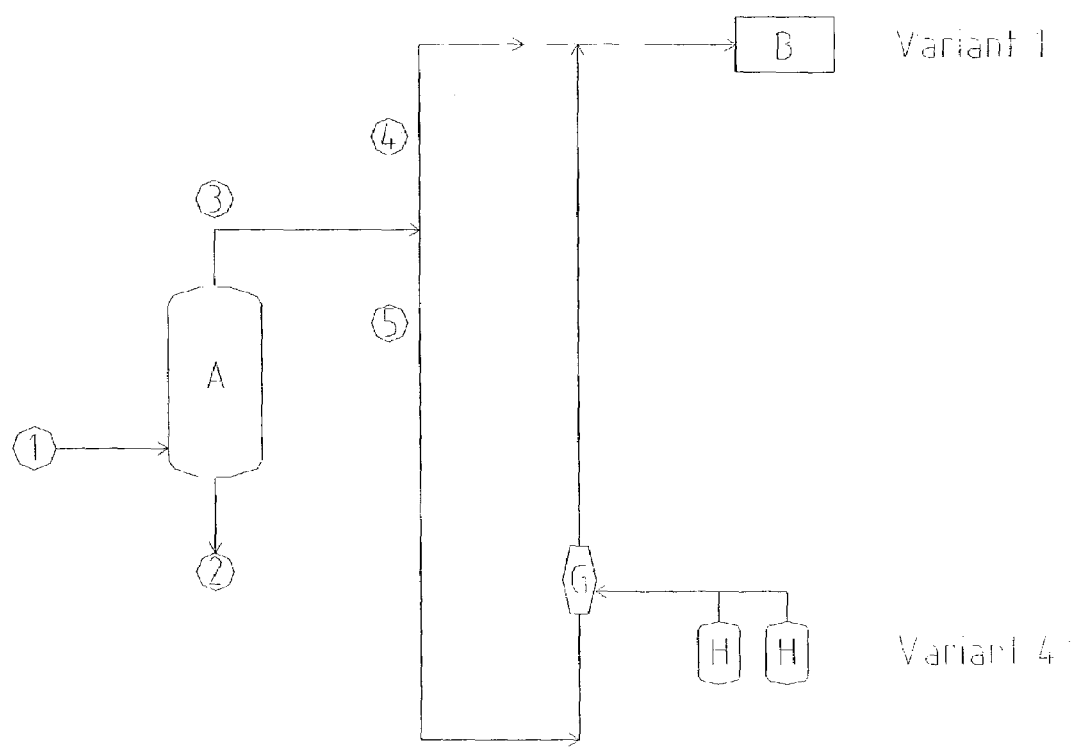
FIG. 4 is a schematic flow diagram of another variation of the process of the invention relating to various emission points.

FIGS. 2–4 illustrate the individual modules of the drying cycle, distillation cycle and the flow system with different vapour emission points, respectively.

The process according to the invention can be carried out using working solutions known in prior art. These preferably contain solvent mixtures of a first solvent, which dissolves in particular anthraquinones, and of a second solvent, which dissolves in particular the anthrahydroquinones. The anthraquinone derivatives acting as reaction carriers are in most cases 2-alkyl-anthraquinones and/or their ring-hydrogenated 2-alkyl-beta-tetrahydroanthraquinones, wherein the alkyl group is linear or/and branched and contains 2 to 6 C atoms. It has also been found advantageous to use two different 2-alkylanthra-quinones and tetrahydroderivatives thereof as reaction carriers. For examples, reference may be made to the U.S. Pat. No. 6,153,169.

The essential advantages of the process according to the invention are that it has been made possible to use the energy of the pressure in the oxidation waste gas, prior to the purification of the latter in the production process, by operating gas jets and thereby producing the vacuum required at various points in the overall process. The introduction of external energy is thereby diminished. Through the process according to the invention, hydrogen peroxide can be obtained in a more economically efficient manner than has hitherto been possible.

The invention will be further explained by means of the following Examples.

EXAMPLE 1

Drying of the Working Solution

A simple vacuum tank provided with a spray trap was used as a dryer. The moist working solution coming from the extraction step was introduced into the upper part of the apparatus and dried at a dryer vacuum of 50 mbar (absolute pressure) and drawn off at the lower end of the apparatus. Vapours, consisting of residual gases, water and solvent components, were drawn at a rate of 49 kg/h from the dryer by means of a commercially available gas jet and using oxidation waste gas as propellant gas. A flow of propellant gas at a rate of 7950 kg/h, having an absolute propellant gas pressure of 2.1 bar, was used for the compression of the vapours to 1050 mbar (absolute). The flow of propellant gas required for this process was less than the total quantity of the flow of oxidation waste gas, so that no external energy was needed for the compression of the required suction flow.

EXAMPLE 2

Distillation of Aqueous Hydrogen Peroxide Solution

A commercially available gas jet was set up for the production of a distillation vacuum of 97 mbar (absolute). Vapours, consisting of residual gases, water and components of the product, were drawn at a rate of 416 kg/h from the distillation column in order to concentrate hydrogen peroxide. Oxidation waste gas at a rate of 8915 kg/h and having an absolute propellant gas pressure of 5 bar was used as a flow of propellant for the compression of these vapours to 1050 mbar (absolute). This flow of propellant gas was less than the available flow of waste gas, so that no additional energy for the production of the vacuum had to be introduced in this case either.

EXAMPLE 3

Drawing off of Solvent via Solvent Tanks

In order to prevent emissions of solvent, a commercially available gas jet having a suction pressure of 750 mbar (absolute) was installed in order to draw off ventilator gases from vent connections of the solvent storage tanks in the hydrogen peroxide plant. Vapours, consisting of residual gases and solvent components, were drawn at a rate of 400 kg/h from the apparatus connected on the suction side. In order to compress these vapours to 1200 mbar (absolute), the gas jet was operated using oxidation waste gas as propellant gas, at a rate of 1390 kg/h and at an absolute propellant gas pressure of 2.2 bar.

Further modification and variation of the present invention will be apparent to those skilled in the art from the foregoing and are intended to be encompassed by the claims appended hereto.

German application 102 07 407.0 of Feb. 21, 2002 is relied on and incorporated herein by reference.

I claim:

1. A process for the production of hydrogen peroxide by the anthraquinone process in a continuously operated production plant, comprising:
   (i) in a hydrogenation step, hydrogenating an organic working solution containing one or more anthraquinone derivatives in the presence of a heterogeneous catalyst, to form a hydrogenated working solution,
   (ii) in an oxidation step, oxidizing the hydrogenated working solution to form an oxidized working solution, with the formation of hydrogen peroxide, by introducing an oxygen-containing oxidizing gas, at an excess pressure $P_i$ of at least 1 bar into an oxidation reactor and contacting it with the working solution from step (i), withdrawing oxidation waste gas from the oxidation reactor and optionally purifying it in a waste-gas purification plant, and
   (iii) recovering the hydrogen peroxide from the oxidized working solution,
   wherein the oxidation waste gas has an excess pressure $P_a$ which is less than $P_i$ but greater than atmospheric pressure $P_0$, and passing the oxidation waste gas as a flow of propellant gas to at least one gas jet and thereby producing a vacuum for auxiliary processes required in the anthraquinone process.

2. The process according to claim 1 further comprising using said vacuum for at least one of the following process steps:
   drying extracted working solution from extraction prior to return of said extracted working solution to the hydrogenation step,
   for distilling resulting aqueous hydrogen peroxide solution,
   for drawing in ventilator gases at emission points of solvent vapours within the production plant.

3. The process according to claim 2 wherein said solvent vapours are from solvent storage tanks.

4. The process according to claim 1, wherein air or oxygen-enriched air as oxidizing gas is introduced into the oxidation reactor at an excess pressure $P_i$ within the range of 2 to 15 bar.

5. The process according to claim 1, wherein the oxidizing gas leaving the oxidation reactor at an excess pressure $P_a$ within the range of 1 to 10 bar is passed, in the form of a propellant jet, to a gas jet.

6. The process according to claim 4, wherein the oxidizing gas leaving the oxidation reactor at an excess pressure $P_a$ within the range of 1 to 10 bar is passed, in the form of a propellant jet, to a gas jet.

7. The process according to claim 1, further comprising in a dryer for drying extracted working solution, producing a dryer vacuum within the range of 10 to 300 mbar absolute, by a gas jet operated by oxidation waste gas and passing a mixture of propellant gas and vapours drawn to a waste-gas purification plant.

8. The process according to claim 4, further comprising in a dryer for drying extracted working solution, producing a dryer vacuum within the range of 10 to 300 mbar absolute, by a gas jet operated by oxidation waste gas and passing a mixture of propellant gas and vapours drawn to a waste-gas purification plant.

9. The process according to claim 5, further comprising in a dryer for drying extracted working solution, producing a dryer vacuum within the range of 10 to 300 mbar absolute, by a gas jet operated by oxidation waste gas and passing a mixture of propellant gas and vapours drawn to a waste-gas purification plant.

10. The process according to claim 1, further comprising at a head of a distillation device for concentrating aqueous hydrogen peroxide solution, forming a distillation vacuum within the range of 20 to 200 mbar absolute by a gas jet operated by oxidation waste gas and passing a mixture of propellant gas and of previously at least partially condensed vapours to a waste-gas purification plant.

11. The process according to claim 4, further comprising at a head of a distillation device for concentrating aqueous hydrogen peroxide solution, forming a distillation vacuum within the range of 20 to 200 mbar absolute by a gas jet operated by oxidation waste gas and passing a mixture of propellant gas and of previously at least partially condensed vapours to a waste-gas purification plant.

12. The process according to claim 5, further comprising at a head of a distillation device for concentrating aqueous hydrogen peroxide solution, forming a distillation vacuum within the range of 20 to 200 mbar absolute by a gas jet operated by oxidation waste gas and passing a mixture of propellant gas and of previously at least partially condensed vapours to a waste-gas purification plant.

13. The process according to claim 1, further comprising in order to prevent emissions of solvent from storage tanks containing organic solvents or working solution, drawing off ventilator gases by a gas jet operated by oxidation waste gas and having a suction pressure within the range of less than atmospheric pressure up to 400 mbar absolute and passing a mixture of propellant gas and gases drawn in to a waste-gas purification plant.

14. The process according to claim 4, further comprising in order to prevent emissions of solvent from storage tanks containing organic solvents or working solution, drawing off ventilator gases by a gas jet operated by oxidation waste gas and having a suction pressure within the range of less than atmospheric pressure up to 400 mbar absolute and passing a mixture of propellant gas and gases drawn in to a waste-gas purification plant.

15. The process according to claim 5, further comprising in order to prevent emissions of solvent from storage tanks containing organic solvents or working solution, drawing off ventilator gases by a gas jet operated by oxidation waste gas and having a suction pressure within the range of less than atmospheric pressure up to 400 mbar absolute and passing a mixture of propellant gas and gases drawn in to a waste-gas purification plant.

16. The process according to claim 1, further comprising passing a mixture of propellant gas and withdrawn gases through a bed of an adsorbent material, in an adsorption plant and freeing said mixture from organic constituents.

17. The process according to claim 16 wherein said bed of absorbent material is activated carbon or a zeolite.

18. The process according to claim 1 further comprising passing the oxidation waste gas to a first gas jet for the purpose of drawing off solvent vapours from storage tanks, and passing at least another gas jet to a dryer for producing the vacuum for the drying of the working solution and/or to a distillation column to operate a distillation column.

* * * * *